(12) United States Patent
Yu et al.

(10) Patent No.: US 10,967,399 B2
(45) Date of Patent: Apr. 6, 2021

(54) FLUOROCARBON RELEASE COATING

(71) Applicant: 3M INNOVATIVE PROPERTIES COMPANY, St. Paul, MN (US)

(72) Inventors: Ta-Hua Yu, Woodbury, MN (US); Moses M. David, Woodbury, MN (US); Kevin D. Hagen, St. Paul, MN (US); Samuel J. Carpenter, Shoreview, MN (US); Eric J. Hanson, Hudson, WI (US); Martin B. Wolk, Woodbury, MN (US); Steven J. McMan, Stillwater, MN (US); Evan L. Schwartz, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/311,437

(22) PCT Filed: Jun. 15, 2017

(86) PCT No.: PCT/US2017/037642
§ 371 (c)(1),
(2) Date: Dec. 19, 2018

(87) PCT Pub. No.: WO2018/005109
PCT Pub. Date: Jan. 4, 2018

(65) Prior Publication Data
US 2019/0184422 A1 Jun. 20, 2019

Related U.S. Application Data

(60) Provisional application No. 62/357,167, filed on Jun. 30, 2016.

(51) Int. Cl.
B05D 3/04 (2006.01)
B05D 5/08 (2006.01)
(Continued)

(52) U.S. Cl.
CPC .............. *B05D 1/62* (2013.01); *B05D 5/083* (2013.01); *B05D 7/04* (2013.01); *B05D 7/50* (2013.01);
(Continued)

(58) Field of Classification Search
None
See application file for complete search history.

(56) References Cited

U.S. PATENT DOCUMENTS 4,781,942 A 11/1988 Leyden
5,082,714 A * 1/1992 Yanai ................. G11B 5/65
428/141

(Continued)

FOREIGN PATENT DOCUMENTS

CN 102958674 A 3/2013
CN 103782366 A 5/2014
(Continued)

OTHER PUBLICATIONS

International Search Report for PCT International Application No. PCT/US2017/037642, dated Nov. 20, 2017, 7 pages.

*Primary Examiner* — Ramsey Zacharia

(57) ABSTRACT

An organofluorine coating on a major surface of a substrate, wherein the organofluorine coating has a surface composition of about 5 at % to about 15 at % oxygen and about 30 at % to about 50 at % fluorine.

12 Claims, 8 Drawing Sheets

(51) Int. Cl.
- *B05D 7/04* (2006.01)
- *B32B 3/30* (2006.01)
- *B32B 15/08* (2006.01)
- *B32B 27/30* (2006.01)
- *C08J 7/04* (2020.01)
- *B05D 1/00* (2006.01)
- *C09D 127/12* (2006.01)
- *B32B 1/00* (2006.01)
- *B05D 7/00* (2006.01)

(52) U.S. Cl.
CPC ............... *B32B 1/00* (2013.01); *B32B 3/30* (2013.01); *B32B 15/08* (2013.01); *B32B 27/304* (2013.01); *B32B 27/308* (2013.01); *C08J 7/0427* (2020.01); *C09D 127/12* (2013.01); *B05D 3/0486* (2013.01); *B05D 2252/02* (2013.01); *B05D 2506/10* (2013.01); *B32B 2307/748* (2013.01); *B32B 2327/12* (2013.01); *C08J 2367/02* (2013.01); *C08J 2427/12* (2013.01)

(56) References Cited

U.S. PATENT DOCUMENTS

| | | | | |
|---|---|---|---|---|
| 5,427,867 | A | * | 6/1995 | Kogure ............... G11B 5/7325 428/141 |
| 5,674,621 | A | * | 10/1997 | Visser ............... G03G 15/2057 428/408 |
| 5,811,183 | A | | 9/1998 | Shaw |
| 5,888,594 | A | | 3/1999 | David |
| 5,945,174 | A | | 8/1999 | Shaw |
| 7,018,713 | B2 | | 3/2006 | Padiyath |
| 2005/0176230 | A1 | | 8/2005 | Sieber |
| 2007/0202340 | A1 | | 8/2007 | Tamitsuji |
| 2014/0091379 | A1 | | 4/2014 | Tang |

FOREIGN PATENT DOCUMENTS

| | | |
|---|---|---|
| EP | 0339880 | 11/1989 |
| EP | 1816231 | 8/2007 |
| WO | WO 2010-078071 | 7/2010 |
| WO | WO 2015-019063 | 2/2015 |
| WO | WO 2017-180502 | 10/2017 |

* cited by examiner

FLUOROCARBON RELEASE COATING

BACKGROUND

A release coating is a low-adhesion coating applied to a major surface of a substrate. The composition of the release coating should be selected such that a particular functional coating or layer applied thereon has limited chemical interaction with the release coating and adheres very weakly thereto. When a small peel force is applied to the functional coating, the functional coating should peel away and separate easily from the release coating without leaving behind substantial functional coating residue at the interface. The release coating should be sufficiently chemically incompatible with the functional coating such that the release coating does not delaminate from the substrate surface and transfer to the functional coating as the functional coating is separated and peeled away, even after the functional coating has been in contact with the release coating for an extended period of time.

Fluoropolymers have good resistance to chemical attack from a variety of functional coatings and have been widely used as release coatings. Fluoropolymer release coatings can be applied on a substrate surface using a wide variety of processes including, for example, wet-chemical coating, vapor coating, and plasma deposition.

SUMMARY

In one aspect, the present disclosure is directed to an organofluorine release coating with a surface composition of about 5 atomic % (at %) to about 15 at % oxygen and about 30 at % to about 50 at % fluorine. In some embodiments, the organofluorine release coating has a surface composition including fluoroether species with about 0.25 at % to about 2.5 at % oxygen in fluoroether form.

In another aspect, the present disclosure is directed to an organofluorine thin film including about 0.25 at % to about 2.5 at % oxygen in fluoroether form.

In another aspect, the present disclosure is directed to an article including a polymeric film with a major surface, wherein at least a portion of the major surface of the polymeric film includes protruding or recessed structures with a density of about 10 structures per $mm^2$ to about 10,000 structures per $mm^2$, and an organofluorine coating layer on the structures, wherein the coating layer includes fluoroether species and a surface composition of about 5 at % to about 15 at % oxygen and about 30 at % to about 50 at % fluorine.

In another aspect, the present disclosure is directed to a fluoropolymer coating on a major surface of a substrate, wherein the coating includes copolymeric repeat units derived from at least one of fluorocarbons having a formula $C_xF_y$, and oxyfluorocarbons having a formula $C_xF_yO_z$, wherein x, y, and z are non-zero positive integers with x=1-6, y=4-14, and z=1, and wherein the values of x, y and z are selected such that the coating comprises about 5 atomic at % to about 15 at % oxygen and about 30 at % to about 50 at % fluorine.

In another aspect, the present disclosure is directed to a fluoropolymer coating on a major surface of a substrate, wherein the coating is derived from fluorocarbons having a formula $C_xF_y$, wherein x=1-6 and y=4-14, reacted with an amount of oxygen sufficient to provide a copolymer with about 5 at % to about 15 at % oxygen and about 30 at % to about 50 at % fluorine.

In another aspect, the present disclosure is directed to a method of making a coating, including: introducing a gaseous fluorocarbon reactant into a reaction chamber; reacting the gaseous fluorocarbon reactant in the presence of a plasma and sufficient oxygen to form an organofluorine coating on a major surface of a substrate, wherein the organofluorine coating has a thickness of less than about 500 nm, and wherein the coating comprises contains about 0.25 at % to about 2.5 at % of oxygen in fluoroether form.

In another aspect, the present disclosure is directed to a method of making a coating, including: introducing at least one gaseous fluorocarbon and an oxygen-containing gas into a reaction chamber with a plasma generating apparatus and a target substrate, wherein the fluorocompound and the oxygen-containing gas are introduced into the reaction chamber in relative amounts sufficient to form in the presence of a plasma a fluorocarbon containing coating with fluoroether species on the substrate, and wherein the organofluorine film has a thickness of less than about 500 nm and has surface composition comprises about 5 at % to about 15 at % oxygen and about 30 at % to about 50 at % fluorine.

In another aspect, the present disclosure is directed to an article including an organofluorine release coating on a major surface of a polymeric film substrate, wherein the organofluorine coating has a surface composition of about 5 at % to about 15 at % oxygen and about 30 at % to about 50 at % fluorine; and a barrier functional coating on the release coating, wherein the barrier functional coating includes a polymeric layer on the release coating and a metal oxide layer on the polymeric layer.

In another aspect, the present disclosure is directed to an article, including a polymeric film substrate; a polymeric layer on the polymeric film substrate; an organofluorine release coating on a major surface of a polymeric layer, wherein the organofluorine coating has a surface composition of about 5 at % to about 15 at % oxygen and about 30 at % to about 50 at % fluorine; and a metal layer on the release coating.

The release force and performance of the release coating is tunable and can be tailored for various coatings to different substrates. The release coating is thin, non-transferable, conformable to a wide variety of surface structures on the substrate, and can be produced in large volumes at a low cost. In some embodiments the release coating is clean, which in this application means that when a functional coating is removed from the release coating, substantially no components transfer from the release coating transfer to the functional coating. In some embodiments, when a functional coating is removed from the release coating, substantially no fluorine, or no fluorine, from the release coating transfers to the functional coating.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the figures indicate like elements.

DETAILED DESCRIPTION

In one aspect, the present disclosure is directed to an organofluorine release coating layer on a substrate, wherein the release coating has a surface composition of about 5 atomic % (at %) to about 15 at % oxygen and about 30 at % to about 50 at % fluorine. In some embodiments, the organofluorine release coating has a surface composition including fluoroether species with about 0.25 at % to about 2.5 at % oxygen in fluoroether form. The organofluorine layer may also be formed as a freestanding thin film.

In some embodiments, the organofluorine release coating is a fluoropolymer including copolymeric repeat units derived from at least one of fluorocarbons having a formula $C_xF_y$, and oxyfluorocarbons having a formula $C_xF_yO_z$, wherein x, y, and z are non-zero positive integers with x=1-6, y=4-14, and z=1. The values of x, y and z are selected such that the resulting copolymeric coating includes about 5 atomic at % to about 15 at % oxygen and about 30 at % to about 50 at % fluorine. In some embodiments, the fluoropolymer includes repeat units derived from fluorocarbons having a formula $C_xF_y$, wherein x=1-6 and y=4-14, which are reacted in the presence of sufficient oxygen to provide a copolymer with about 5 at % to about 15 at % oxygen and about 30 at % to about 50 at % fluorine.

While not wishing to be bound by any theory, presently available evidence indicates that the copolymeric organofluorine release coating formed from the reaction of at least one of the fluorocarbon and the oxyfluorocarbons includes periodically randomly occurring perfluoropolyether repeat units within and pendant from the copolymer backbone such that oxygen is present in the coating at about 0.25 at % to about 2.5 at % in fluoroether form.

In some embodiments, which are not intended to be limiting, suitable fluorocarbon reactants $C_xF_y$ used to form the copolymeric organofluorine release coating include $CF_4$, $C_2F_6$, $C_3F_8$, $C_4F_{10}$, and $C_6F_{14}$, while suitable oxyfluorocarbon reactants include $C_6F_{12}O$.

The copolymeric organofluorine release coating can be formed on a wide variety of substrates including, but not limited to, polymeric films, metals, metal oxides, ceramics, glasses, papers, and nonwoven materials. Suitable polymeric films include, for example, polyolefins such as polyethylene or polypropylene, polyvinyl chloride, polycarbonate, polyester, polyether, polyamide, polyimide, polyvinylalcohol, polyurethane, polycellulose. Suitable metals include, for example, copper, iron, stainless steel, aluminum, nickel, and alloys thereof. In various embodiments, the substrate on which the copolymeric organofluorine release coating is formed is a continuous film or sheet, but may be a flat plate, a hollow filament, a cylinder, a rod, sphere, block, powder and the like.

Figure 1:
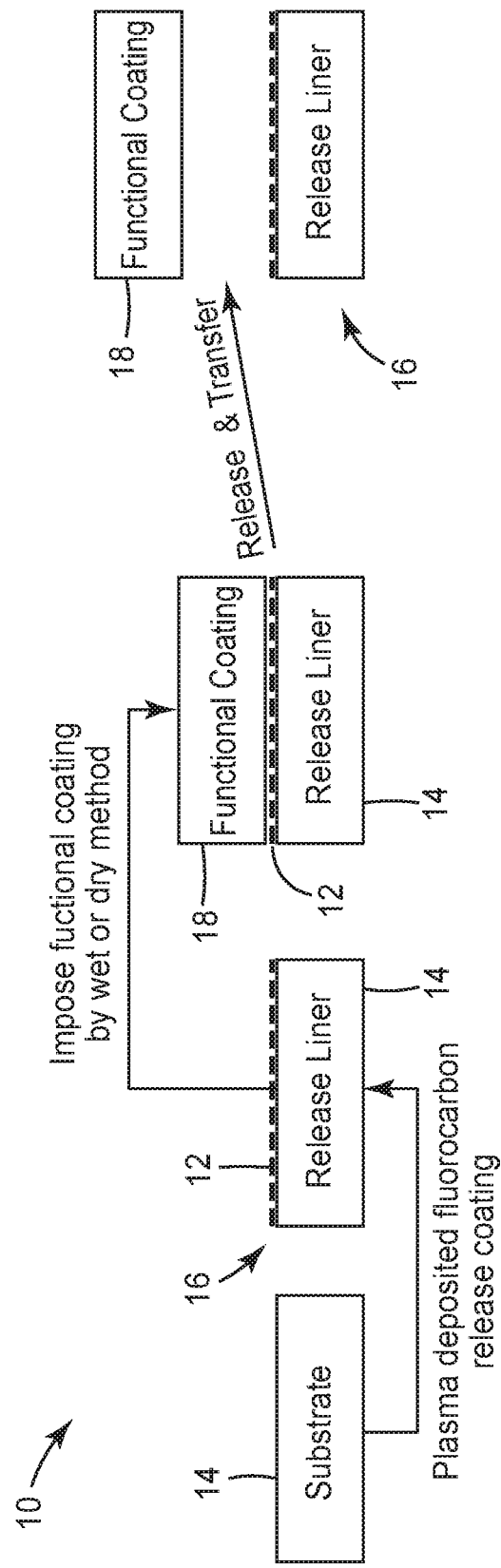
FIG. 1 is a schematic diagram of a process for applying a release coating on a substrate.

Referring to a process 10 shown schematically in FIG. 1, in some embodiments a copolymeric organofluorine release coating layer 12 may be applied to a polymeric film or paper substrate sheet 14 to form a release liner 16. In various embodiments, which are not intended to be limiting, the copolymeric organofluorine release coating layer 12 has a thickness of less than about 500 nm, or less than about 250 nm, or less than about 100 nm.

The release coating layer 12 on the release liner may then have a functional coating 18 applied thereon by any suitable wet or dry coating technique. Various functional layers or coatings 18 can be applied on the coating layer 12 including, but not limited to, polymeric films or layers, metals, visible light-transmissive conductive layers or electrodes (e.g., indium tin oxide (ITO)); antistatic coatings or films; flame retardants; UV stabilizers; abrasion resistant or hardcoat materials; optical coatings; anti-fogging materials; magnetic or magneto-optic coatings or films; photographic emulsions; prismatic films; holographic films or images; adhesives such as pressure sensitive adhesives or hot melt adhesives; primers to promote adhesion to adjacent layers, and the like.

Figure 5:
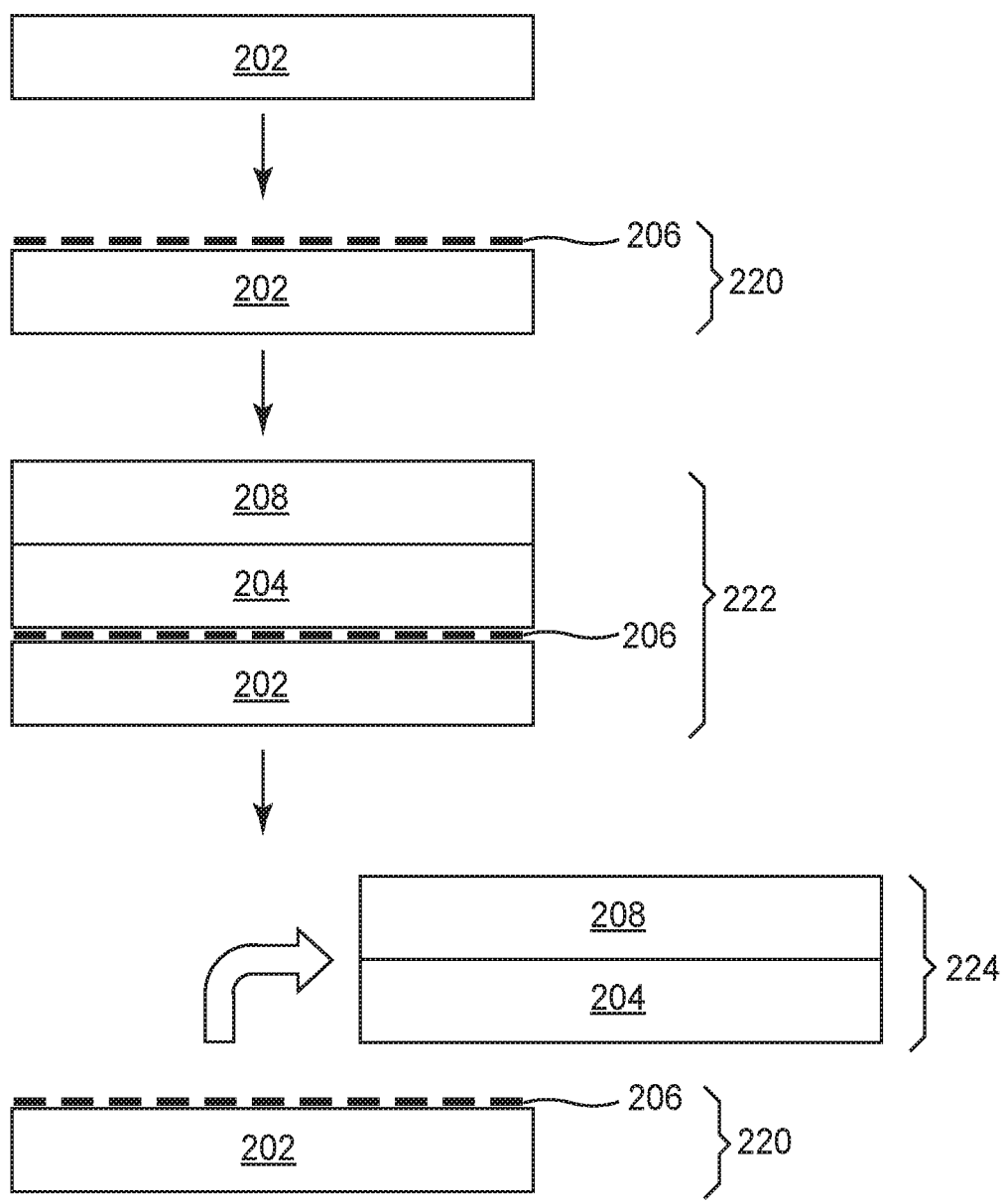
FIG. 5 is a schematic flow diagram of a process for making the release coatings of Examples 1-5.

For example, in one embodiment (an example is shown in FIG. 5 and is described in more detail below) the functional coating 18 includes a polymer layer (for example, an acrylate) on the release coating layer 12, and an inorganic barrier layer of a metal oxide (for example, ITO) on the polymer layer. In some embodiments, at least one layer of these polymer/metal oxide multilayer functional coatings can be utilized as a barrier film or assembly to prevent premature failure of organic light emitting devices (OLED) when exposed to water vapor or oxygen, and are described in more detail in U.S. Pat. No. 7,018,713.

In some embodiments, the polymeric coating layer on the release coating layer 12 is an acrylate with a Tg of at least about 110° C., or at least about 150° C., or at least about 200° C. Especially preferred monomers that can be used to form the first layer include urethane acrylates (e.g., CN-968, Tg=about 84° C. and CN-983, Tg=about 90° C., both commercially available from Sartomer Co.), isobornyl acrylate (e.g., SR-506, commercially available from Sartomer Co., Tg=about 88° C.), dipentaerythritol pentaacrylates (e.g., SR-399, commercially available from Sartomer Co., Tg=about 90° C.), epoxy acrylates blended with styrene (e.g., CN-120580, commercially available from Sartomer Co., Tg=about 95° C.), di-trimethylolpropane tetraacrylates (e.g., SR-355, commercially available from Sartomer Co., Tg=about 98° C.), diethylene glycol diacrylates (e.g., SR-230, commercially available from Sartomer Co., Tg=about 100° C.), 1,3-butylene glycol diacrylate (e.g., SR-212, commercially available from Sartomer Co., Tg=about 101° C.), pentaacrylate esters (e.g., SR-9041, commercially available from Sartomer Co., Tg=about 102° C.), pentaerythritol tetraacrylates (e.g., SR-295, commercially available from Sartomer Co., Tg=about 103° C.), pentaerythritol triacrylates (e.g., SR-444, commercially available from Sartomer Co., Tg=about 103° C.), ethoxylated (3) trimethylolpropane triacrylates (e.g., SR-454, commercially available from Sartomer Co., Tg=about 103° C.), ethoxylated (3) trimethylolpropane triacrylates (e.g., SR-454HP, commercially available from Sartomer Co., Tg=about 103° C.), alkoxylated trifunctional acrylate esters (e.g., SR-9008, commercially available from Sartomer Co., Tg=about 103° C.), dipropylene glycol diacrylates (e.g., SR-508, commercially available from Sartomer Co., Tg=about 104° C.), neopentyl glycol diacrylates (e.g., SR-247, commercially available from Sartomer Co., Tg=about 107° C.), ethoxylated (4) bisphenol a dimethacrylates (e.g., CD-450, commercially available from Sartomer Co., Tg=about 108° C.), cyclohexane dimethanol diacrylate esters (e.g., CD-406, commercially available from Sartomer Co., Tg=about 110° C.), isobornyl methacrylate (e.g., SR-423, commercially available from Sartomer Co., Tg=about 110° C.), cyclic diacrylates (e.g., IRR-214, commercially available from UCB Chemicals, Tg=about 208° C.) and tris (2-hydroxy ethyl) isocyanurate triacrylate (e.g., SR-368, commercially available from Sartomer Co., Tg=about 272° C.), acrylates of the foregoing methacrylates and methacrylates of the foregoing acrylates.

A variety of inorganic barrier materials can be employed on the polymeric coating layer. Suitable inorganic barrier materials include metal oxides, metal nitrides, metal carbides, metal oxynitrides, metal oxyborides, and combinations thereof, e.g., silicon oxides such as silica, aluminum oxides such as alumina, titanium oxides such as titania, indium oxides, tin oxides, indium tin oxide (ITO), tantalum oxide, zirconium oxide, niobium oxide, boron carbide, tungsten carbide, silicon carbide, aluminum nitride, silicon nitride, boron nitride, aluminum oxynitride, silicon oxynitride, boron oxynitride, zirconium oxyboride, titanium oxyboride, and combinations thereof. Indium tin oxide, silicon oxide, aluminum oxide and combinations thereof are especially preferred inorganic barrier materials. ITO is an example of a special class of ceramic materials that can become electrically conducting with the proper selection of the relative proportions of each elemental constituent. The inorganic barrier layers preferably are formed using techniques employed in the film metallizing art such as sputtering (e.g., cathode or planar magnetron sputtering), evaporation (e.g., resistive or electron beam evaporation), chemical vapor deposition, plating and the like. Most preferably the inorganic barrier layers are formed using sputtering, e.g., reactive sputtering Enhanced barrier properties have been observed when the inorganic layer is formed by a high energy deposition technique such as sputtering compared to lower energy techniques such as conventional chemical vapor deposition processes.

Figure 7:
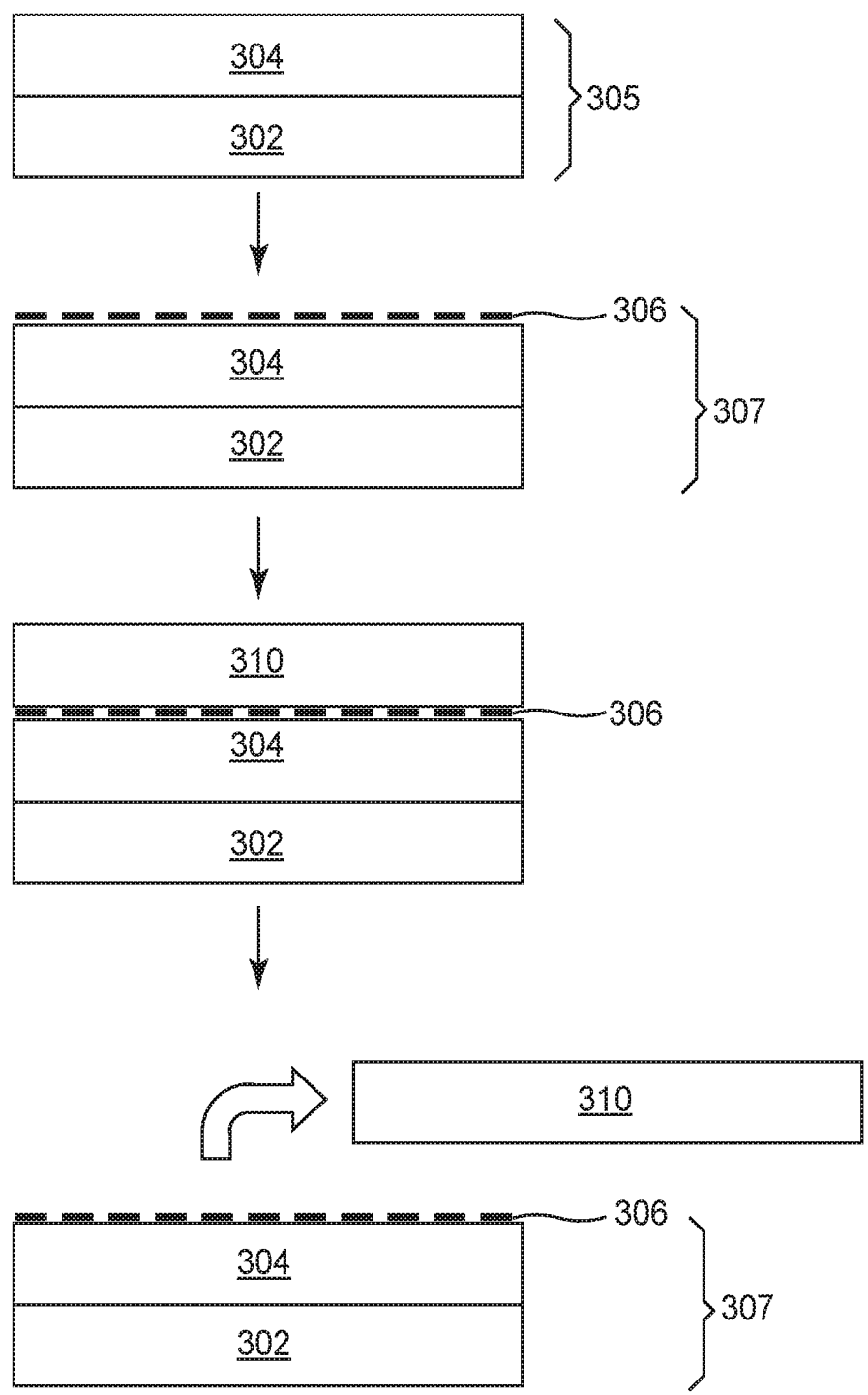
FIG. 7 is a schematic flow diagram of a process for making the release coatings of Examples 6-8.

In another embodiment, (an example is shown in FIG. 7 and is described in more detail below) a polymeric layer (examples include, but are not limited to, the acrylates described above) may be applied directly on the substrate, and the copolymeric organofluorine release coating layer can be applied on the polymeric layer. A functional coating including a metal layer chosen from, for example, aluminum, silver, gold, copper, and combinations thereof, can then be applied on the copolymeric organofluorine release coating layer.

The functional coating or layer 18 may subsequently be peeled away from the release coating layer 12 and transferred. In the embodiment of FIG. 1, the release leaves behind the copolymeric organofluorine release coating layer 12 on the release liner 14. However, any functional layer on the copolymeric organofluorine release coating layer, which in the examples discussed above can include successive stacks of polymer/ITO, or a single layer of a metal films, can be peeled away and removed from the copolymeric organofluorine release coating layer with a very low peel force of less than about 15 grams per inch, or less than about 10 grams per inch, or less than about 5 grams per inch. In some embodiments, the release of the copolymeric organofluorine release coating from the functional coating is extremely clean, which is the present application means that the release process leaves substantially no fluorine residue behind on the transferred functional coating. In some embodiments, the release process leaves no fluorine residue on the functional coating following the release process.

In the embodiment illustrated in FIG. 1, a major surface of the substrate to which the copolymeric organofluorine release coating is applied to form the release liner is relatively smooth and has an average surface roughness, Ra, of less than about 2 nm, or less than about 1 nm.

Figure 2:
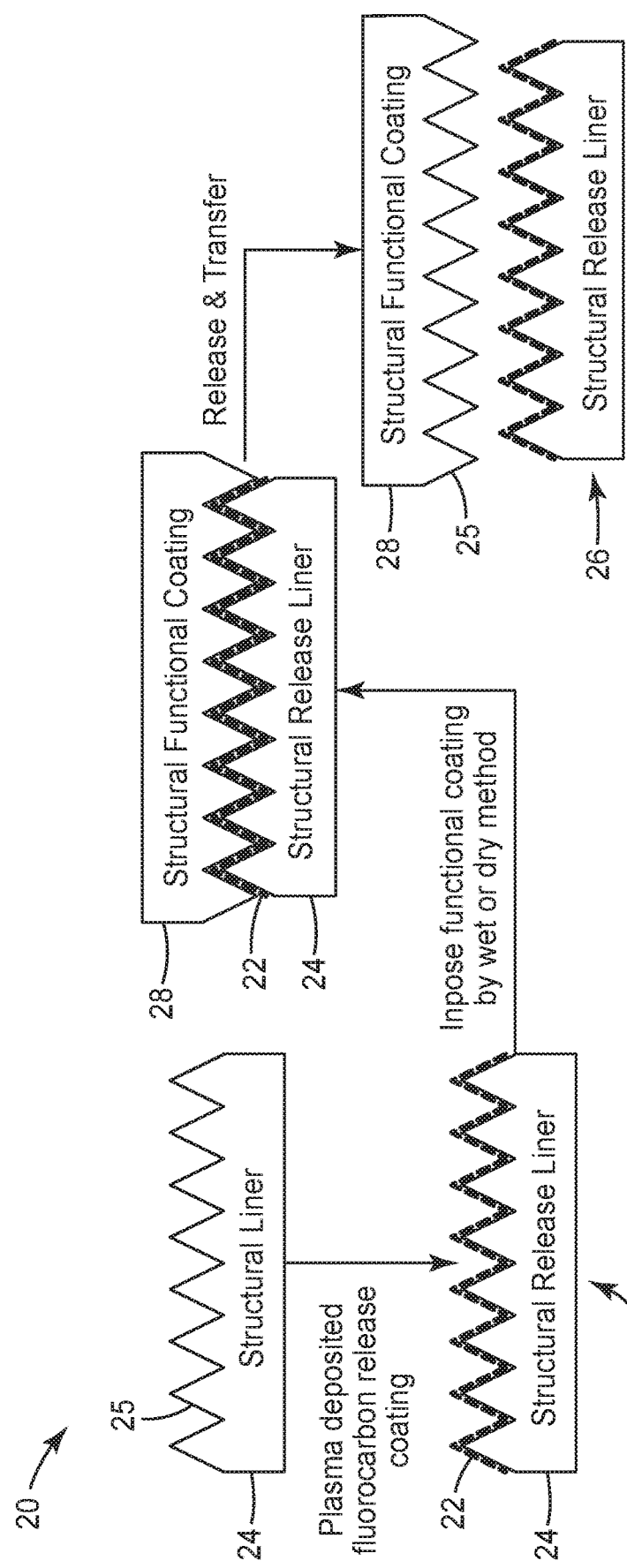
FIG. 2 is a schematic diagram of a process for applying a release coating on a structured substrate.

In another embodiment of a process 20 illustrated schematically in FIG. 2, a copolymeric organofluorine release coating layer 22 is applied on a structured substrate 24 to form a structured release liner 26. The structured substrate 24 includes at least one major surface having at least a portion thereof occupied by a random or periodic arrangement of protruding or recessed microstructures or nanostructures 25. The topography may be created in the surface of the substrate 24 by any contacting technique, such as casting, coating or compressing. In various embodiments, the topography may be made by at least one of: (1) casting the substrate on a tool with an embossed pattern, (2) coating substrate onto a release liner with an embossed pattern, or (3) passing the substrate through a nip roll to compress the adhesive against a release liner with an embossed pattern. The topography of the tool used to create the embossed pattern may be made using any known technique, such as, for example, chemical etching, mechanical etching, laser ablation, photolithography, stereolithography, micromachining, knurling, cutting or scoring.

The protruding microstructures 25 on the structured substrate 24 have a topographical feature density of greater than 10, or greater than 100, or greater than 1000, or greater than 10,000 features or greater per square millimeter ($mm^2$) on the substrate. Non-limiting examples of microstructures or nanostructures 25 that can be conformally covered by the copolymeric organofluorine release coating layer 22 include hemispheres, right pyramids, trigonal pyramids, square pyramids, quadrangle pyramids, "V" grooves, and the like.

The release coating layer 22 on the structured release liner 26 may then have a structured functional coating 28 applied thereon by any suitable wet or dry coating technique. The structured functional coating 28 may subsequently be peeled away from the structured release coating layer 22 and transferred with structures 25 intact, leaving behind the copolymeric organofluorine release coating layer 22 on the release liner 26.

The copolymeric organofluorine release coating may be applied on the substrate by a wide variety of techniques, but in one example embodiment, which is not intended to be limiting, a plasma deposition technique has been found to efficiently and reproducibly form the release coating on a substrate in a single step in roll-to-roll fashion at low cost. Referring to an embodiment of a process 100 shown in FIG. 3, a roll-to-roll vacuum processing chamber 102 includes a rotatable drum-like cylindrical electrode 104 powered by a radio frequency (RF) source 106 and a grounded center electrode 108. In some embodiments, the electrode 104 may optionally be cooled. A web of polymeric film 110 proceeds around a first arrangement of rollers 112 and then traverses an outer surface 114 of the rotatable drum-like electrode 104.

The interior of the chamber 102 may be at atmospheric pressure or be maintained under vacuum, and in some embodiments the interior of the chamber 102 may be filled with an inert gas such as nitrogen, argon or the like.

A first fluorocarbon or oxyfluorocarbon gaseous reactant stream 116 including at least one of fluorocarbons having a formula $C_xF_y$ and oxyfluorocarbons having a formula $C_xF_yO_z$, wherein x, y, and z are non-zero positive integers with x=1-6, y=4-14, and z=1 is introduced into the chamber 102. The fluorocarbon or oxyfluorocarbon gaseous reactant stream 116 can include one or a mixture of gases, and suitable gases include, but are not limited to, $CF_4$, $C_2F_6$, $C_3F_8$, $C_4F_{10}$, and $C_6F_{14}$, $C_6F_{12}O$, and combinations thereof. An optional second reactive or non-reactive gaseous stream 118 may also be introduced into the chamber 102, and the second gaseous stream includes a non-fluorinated compound such as hydrogen, helium, oxygen, fluorine, argon, carbon monoxide, carbon dioxide, nitrogen dioxide, steam, and combinations thereof. In some embodiments, the second gaseous stream 118 is oxygen or a gas containing oxygen.

The rotatable drum-like cylindrical electrode 104 is energized and set in motion such that a portion 120 of the film web 110 moves around the exterior 114 of the electrode and a plasma 122 is generated within the chamber 102. As the film 110 moves over the surface 114, the portion 120 of the film 110 is exposed to the plasma 122, which causes the reactants in the first gaseous stream 116 and the optional second gaseous stream 118 to react on the exposed surface 123 of the film web 110 to form a copolymeric organofluorine release coating layer thereon. A portion 124 of the film web 110 including the release coating layer 132 thereon traverses a second set of rollers 130 and then may be removed from the chamber 102 for further processing.

The flow rates of the first gaseous stream 116 and the optional second gaseous stream 118 are selected to produce a release coating layer 132 with a desired combination of release characteristics for a selected application. In some embodiments, which are not intended to be limiting, the release coating layer 132 includes about 5 atomic at % to about 15 at % oxygen and about 30 at % to about 50 at % fluorine. In some embodiments, the flow rates of the first gaseous stream 116 and the optional second gaseous stream 118 are selected to produce a release coating layer 132 including oxygen at about 0.25 at % to about 2.5 at % in fluoroether form. For example, in some non-limiting embodiments the first gaseous stream 116 includes a fluorocarbon $C_xF_y$, and the second gaseous stream 118 includes oxygen, and the reactant gases are introduced into the chamber 102 at a $C_xF_y$:O ratio of from about 4:1 to about 1:1, about 3:2 to about 2:3, at about 4 parts $C_xF_y$ to about 1 part oxygen, or at about 3 parts $C_xF_y$ to about 2 parts oxygen, to provide a release coating layer 132 with excellent release properties.

Embodiment of the invention will now be described with reference to the following non-limiting examples.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Solvents and other reagents used may be obtained from Sigma-Aldrich Chemical Company (Milwaukee, Wis.) unless otherwise noted. In addition, Table 1 provides abbreviations and a source for all materials used in the Examples below:

TABLE 1

Materials.

| Abbreviation or Tradename | Description | Source |
| --- | --- | --- |
| $C_6F_{14}$ | Perfluorohexane | 3M Corporation (St. Paul, MN) |
| SR833S | Tricyclodecane dimethanol diacrylate | Sartomer Americas (Exton, PA) |
| PET | 1.97 3M PTA-Clear film | 3M Corporation (St. Paul, MN) |
| Indium Tin Oxide target | 95% In/5% Sn ceramic target | Umicore Thin Film Products (Providence, RI) |
| 3M item #8403 | green silicone tape Scotch tape | 3M Corporation (St. Paul, MN) 3M Corporation (St. Paul, MN) |

Methods

Plasma Coater Method

Plasma fluorochemical thin film coatings were deposited using the plasma treatment system described in U.S. Pat. No. 5,888,594 (David et al.) with some modifications. The width of the drum electrode was increased to 42.5 inches (108 cm) and the separation between the two compartments within the plasma system was removed so that all the pumping was carried out by means of turbo-molecular pumps.

Rolls of polymeric film were mounted within the chamber, the film wrapped around the drum electrode and secured to the take up roll on the opposite side of the drum. The unwind and take-up tensions were maintained at 6 pounds, and 12 pounds, respectively. The chamber door was closed and the chamber pumped down to a base pressure of $5 \times 10^{-4}$ torr. A gas mixture of either pure $C_6F_{14}$, or oxygen combined with $C_6F_{14}$ was introduced into the chamber under various conditions described in the examples below. Plasma was turned on at a power of 3000 watts by applying radio frequency power to the drum and the drum rotation initiated so that the film was transported at a speed of 10 feet per minute (ft/min) normally, or at different line speeds as indicated in specific examples below. In certain cases, sheets of substrate film were taped onto the cylindrical electrode, and treated for a specified amount of time as indicated in the examples below.

Roll to Roll Vacuum Coating Method

Figure 4:
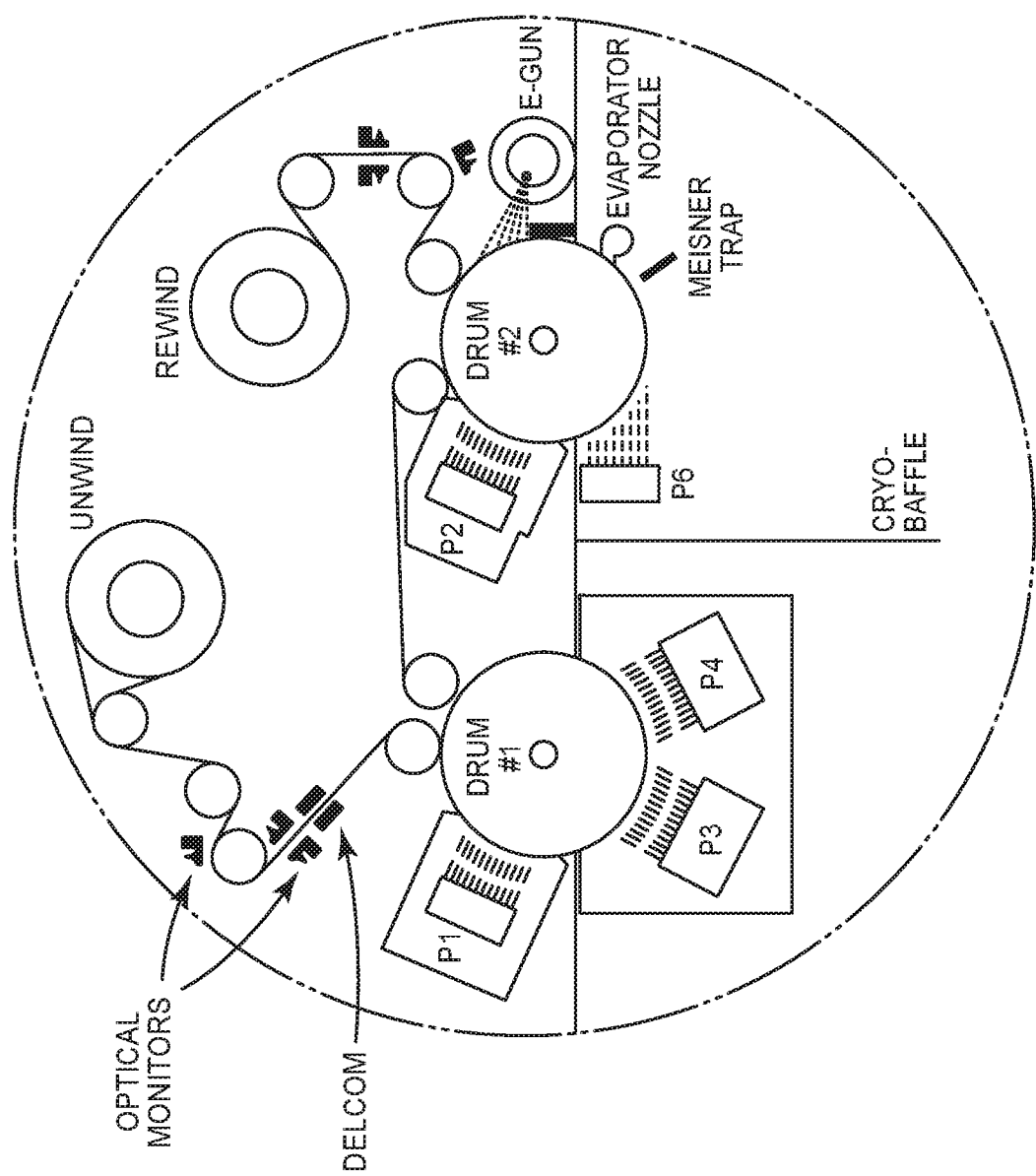
FIG. 4 is an overhead view of the roll-to-roll vapor coating apparatus.

The roll-to-roll vacuum coater is illustrated schematically in FIG. 4. It was a dual drum sputter system with 5 sputter positions and an organic multi-layer system that used electron gun (e-gun) curing. For oxide deposition, argon and oxygen were introduced to the sputter deposition zone using mass flow controller through gas manifolds on each side of the sputter cathode. For organic vapor deposition, acrylate monomer was evaporated with an atomizer at elevated temperature and introduced onto the web and crosslinked using electron gun (e-gun) curing.

Batch Deposition Coater

Aluminum was coated onto 152 mm by 152 mm substrates by magnetron physical vapor deposition. The films were sputtered from a 76.2 mm round aluminum target in a batch coater. The substrate was placed on a substrate holder set up inside a vacuum chamber with a sputtering metal target located at a height of 228.6 mm above the substrate holder. After the chamber was evacuated to $6 \times 10^{-6}$ torr base pressure, sputter gas of argon was admitted inside the chamber and total pressure of the chamber was adjusted to 5 millitorr. Sputtering was initiated using a DC power supply at a constant power level of 0.5 kilowatts.

Peel Test

Peel test was performed following the test method of ASTM D 3330/D 3330M-04 using an IMASS Peel Tester SP-101A (IMASS, Hingham, Mass., USA). A strip of 2 inch wide sample was attached to the testing machine with a double-sided tape with the coated side facing up. A strip of 1 inch #8403 tape was then laminated to the sample using a roller. A clamping rod was attached to one end of the #8403 tape and the peel test was conducted at a speed of 90 inch/min. The peel force is reported as an average of multiple samples.

Release Test

A strip of 2 inch wide coated sample was attached to a table with a double-sided tape with the coating side facing up. A strip of Scotch tape was then laminated to the upper surface of the sample using a roller. The Scotch tape was then peeled off from the sample. The surface of the sample and the tape were then visually inspected to determine the releasing properties.

Release Coating Compositions Analysis

Figure 3:
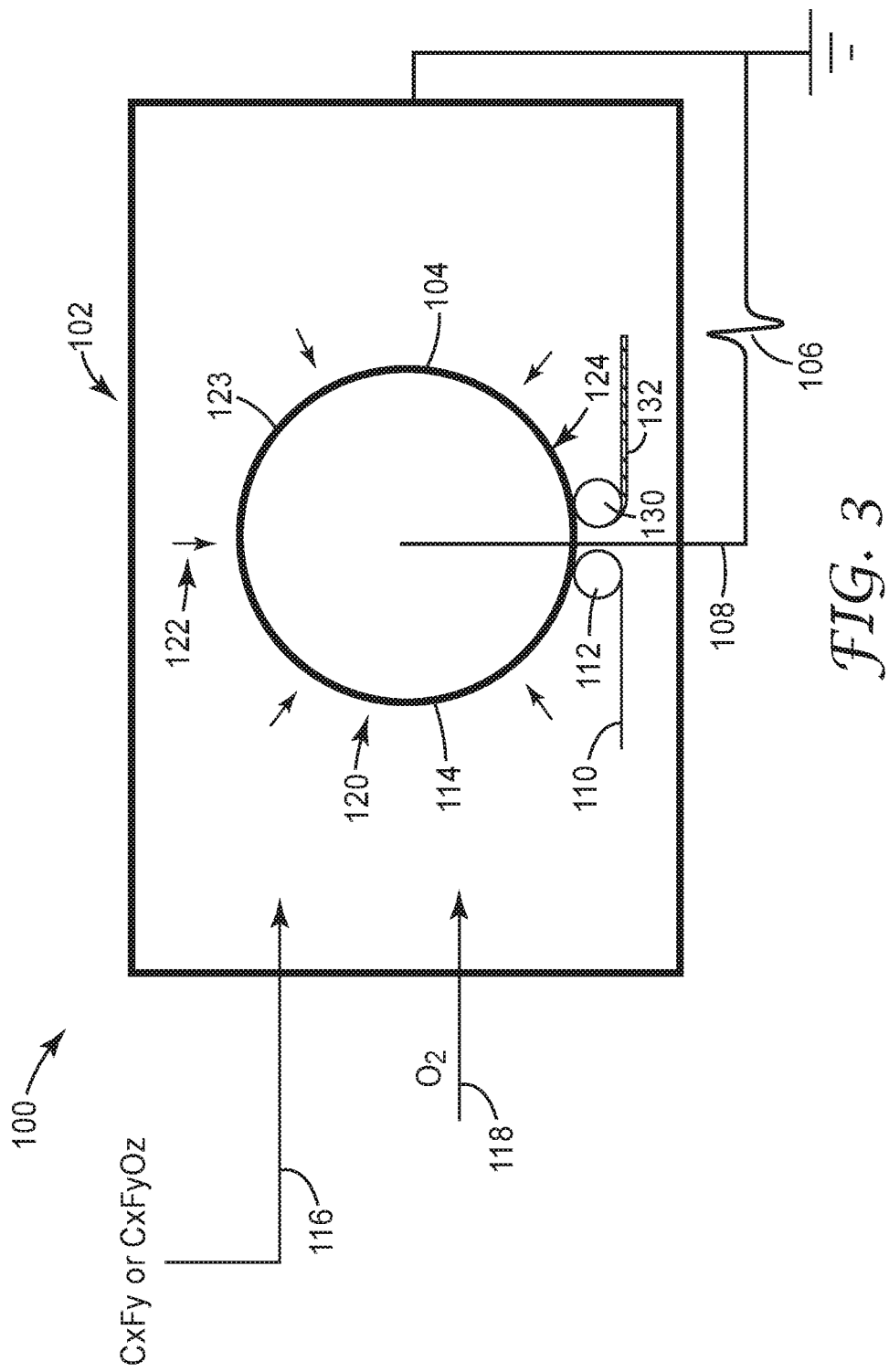
FIG. 3 is schematic cross-sectional view of a roll-to-roll plasma coating apparatus that can be used to make a plasma-deposited release coating on a roll of material.
Figure 8:
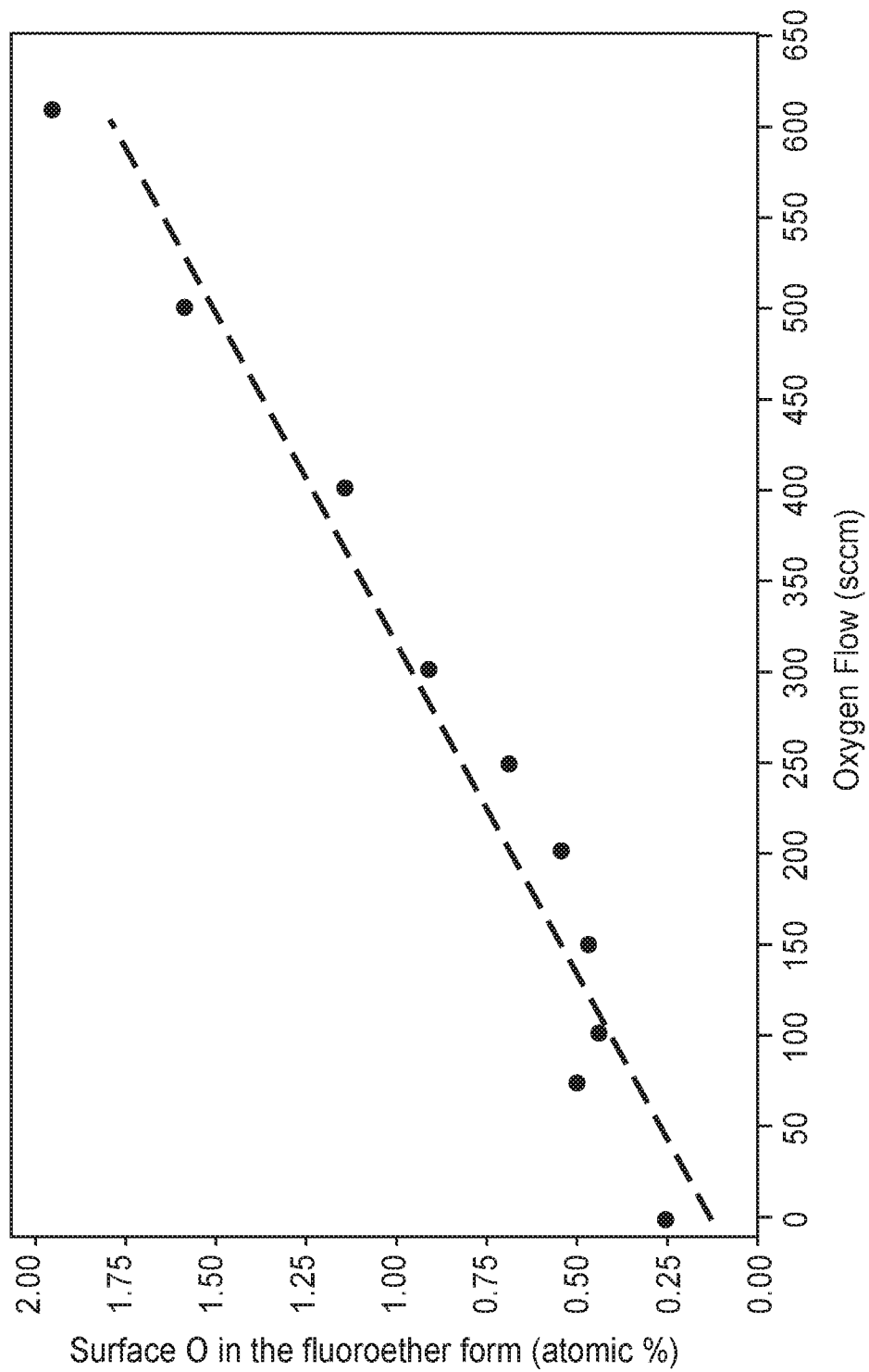
FIG. 8 is a plot surface perfluoroether species atomic % versus $O_2$ flow in the working examples of this application.

Samples were coated with fluorocarbon plasma coating with different levels of $O_2$ flow rate using the roll-to-roll plasma coating apparatus shown schematically in FIG. 3. The surfaces of the samples were examined using X-ray Photoelectron Spectroscopy (XPS) (also known as Electron Spectroscopy for Chemical Analysis (ESCA)). This technique provided an analysis of the outermost 3 to 10 nanometers (nm) of the specimen surface. The photoelectron spectra provided information about the elemental and chemical (oxidation state and/or functional group) concentrations present on a solid surface. It was sensitive to all elements in the periodic table except hydrogen and helium with detection limits for most species in the 0.1 to 1 atomic % concentration range. Perfluoroether species were found on the surfaces of the samples and their atomic % was determined and plotted versus $O_2$ flow rate in FIG. 8.

Examples 1-5

Referring the schematic diagram in FIG. 5 and the apparatus in FIG. 3, a two mil PET film 202 was coated with plasma-deposited perfluorohexane in the presence of oxygen using a roll-to-roll plasma coating apparatus.

The plasma coater was operated at a line speed of 10 feet per minute (fpm) with a power of 3000 W, resulting in the formation of a perfluoroalkyl ether release coating 206. Gas flow rates of perfluorohexane ($C_6F_{14}$) and oxygen ($O_2$) in the plasma coater are provided in Table 2 for each example and are given as standard cubic centimeters per minute (sccm).

Referring again to FIG. 5, the resulting release-coated PET film 220 was then placed in a roll-to-roll vacuum coater of FIG. 4 where a layer 204 of SR833S was vapor deposited and cured using an electron beam, followed by deposition of a layer of tin-doped indium oxide (ITO) 208. The SR833S acrylate monomer was introduced into the vacuum chamber via a thermal evaporator. The monomer vapor passed through a slit die mounted near the coating drum and condensed on the substrate as it passed by the vapor coating station. The condensed monomer was carried into the cure zone and polymerized using the electron beam. The electron beam high voltage was -7.1 kV and the grid current was 9.0 mA. The resulting acrylate thickness was 1.0 micron. The ITO deposition used a ceramic sputter target. The process gases were argon and $O_2$ with a process pressure of 3.0 mTorr. The sputter power was 3.0 kW and the line speed was 4.0 fpm. The resulting conductive ITO film 222 had a sheet resistivity of 200 ohms/sq.

Referring again to FIG. 5, the release force of the combined SR833S-ITO layers 224 from the release-coated PET 220 was tested by a peel tester against one inch wide #8403 tape. The average release force for each example is presented in Table 2.

Figure 6:
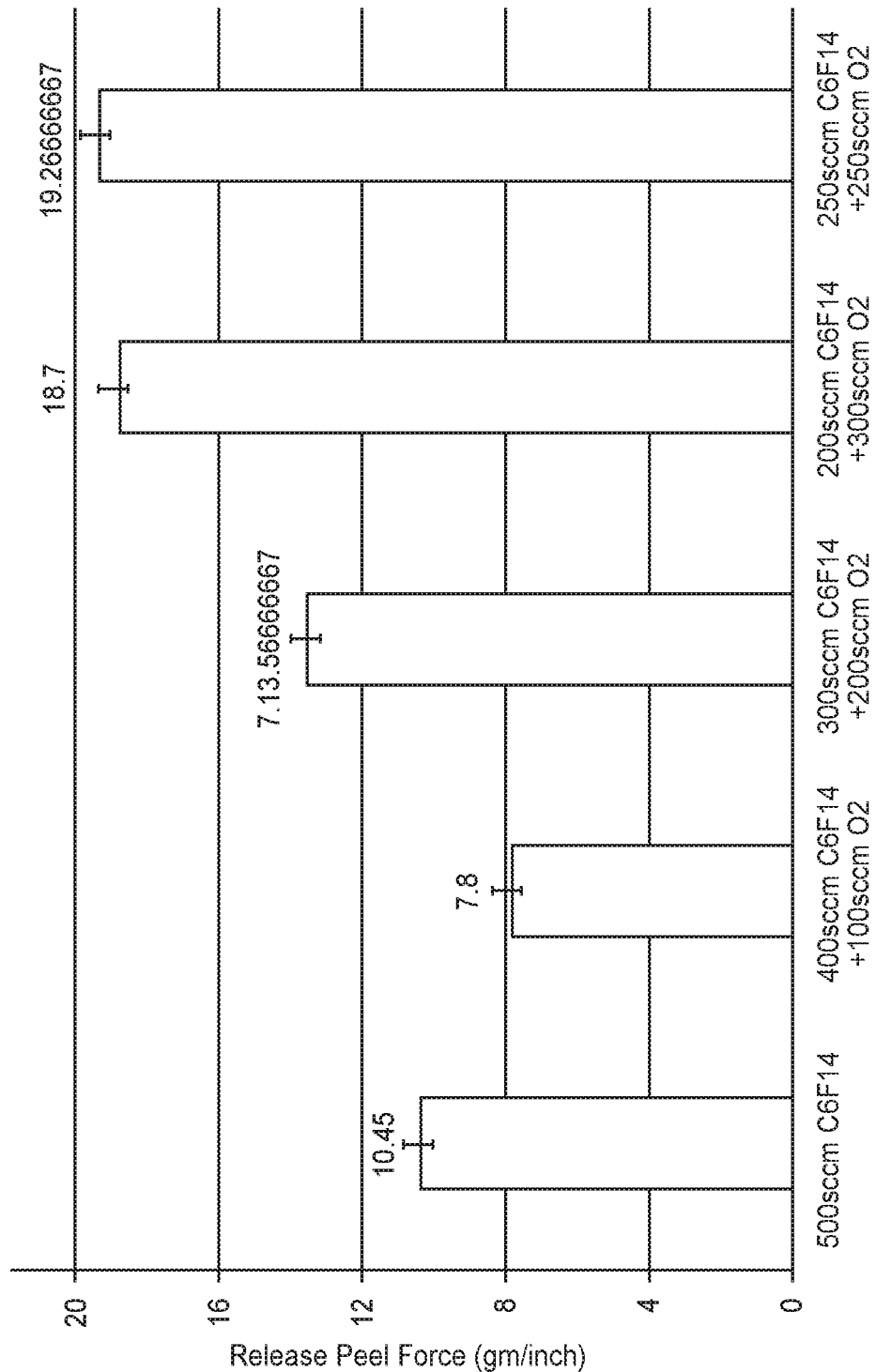
FIG. 6 is a plot of peel testing results for the release coatings of constructions 222 in Examples 1-5.

Results of peel testing are shown in chart form in FIG. 6.

TABLE 2

Gas flow rates used to fabricate perfluoroalkyl ether release coatings and peel force values for multilayer constructions comprising them.

| Example | Gas flow rates | Peel force (grams per inch) |
| --- | --- | --- |
| Example 1 | 500 sccm $C_6F_{14}$ | 10.45 |
| Example 2 | 400 sccm $C_6F_{14}$ + 100 sccm $O_2$ | 7.8 |
| Example 3 | 300 sccm $C_6F_{14}$ + 200 sccm $O_2$ | 13.57 |
| Example 4 | 200 sccm $C_6F_{14}$ + 300 sccm $O_2$ | 18.7 |
| Example 5 | 250 sccm $C_6F_{14}$ + 250 sccm $O_2$ | 19.27 |

Examples 6-8 & Comparative Examples 1-3

According to the process shown schematically in FIG. 7, a layer 304 of SR833S was deposited and polymerized on a 2 mil thick PET film substrate 302 using a roll-to-roll vacuum coater of FIG. 4 to form a construction 305. The SR833S acrylate monomer was introduced into the vacuum chamber via a thermal evaporator. The monomer vapor passed through a slit die mounted near the coating drum and condensed on the substrate as it passed by. The condensed monomer was carried into the cure zone and polymerized using an electron beam. The electron beam high voltage was -7.1 kV and the grid current was 9.0 mA. The resulting acrylate thickness of the layer 304 was 1.0 micron.

As shown in FIG. 7, the coated PET film construction 305 was then transferred to a plasma coater illustrated in FIG. 3, where plasma deposited perfluorohexane in the presence of oxygen was applied at 10 fpm with a power of 3000 W to generate a perfluoroalkyl ether release coating 306 on the surface of the polymerized acrylate 304 and form a release construction 307. The conditions used for each Example and Comparative Example are provided in Table 3.

Referring again to FIG. 7, a layer of aluminum 310 was then deposited on the release coating 306 using a batch deposition coater according to the conditions provided in Table 3. Scotch tape was laminated to the aluminum layer 310 of each multilayer construct and the aluminum layer 310 was separated from the release construction 307. The release performance was evaluated using the procedure provided in the Release Test. The rating of releasing performance and processing conditions are provided in Table 3.

TABLE 3

Release coating deposition conditions, aluminum metallization conditions, and release results.

| Example | Perfluorohexane (sccm) | Oxygen (sccm) | Aluminum metallization | Release test |
|---|---|---|---|---|
| Comparative Example 1 | 500 | 0 | 0.25 kW 3 minutes 50 seconds | Partial release and slightly difficult to release |
| Comparative Example 2 | 400 | 100 | | Partial release |
| Example 6 | 300 | 200 | | Release |
| Example 7 | 200 | 300 | | Easy release |
| Comparative Example 3 | 100 | 400 | | Not releasable |
| Example 8 | 150 | 150 | | Easy release |

Various embodiments have been described. These and other embodiments are within the scope of the following claims.

The invention claimed is:

1. An organofluorine coating on a major surface of a substrate, wherein the organofluorine coating has a surface composition of about 5 at % to 15 at % oxygen and about 30 at % to 50 at % fluorine; wherein the major surface of the substrate comprises protruding or recessed structures with a density of about 10 structures per $mm^2$ to about 10,000 structures per $mm^2$, and wherein the coating overlies and conforms to the structures.

2. The coating of claim 1, wherein the coating has a thickness of less than about 500 nm.

3. The coating of claim 1, wherein the coating has a release peel force from the substrate of less than about 15 grams/inch.

4. A method of making the coating of claim 1, comprising:
introducing a gaseous fluorocarbon reactant into a reaction chamber;
reacting the gaseous fluorocarbon reactant in the presence of a plasma and sufficient oxygen to form an organofluorine coating on a major surface of a substrate, wherein the organofluorine coating has a thickness of less than about 500 nm and wherein the coating comprises about 0.25 at % to about 2.5 at % of oxygen in fluoroether form.

5. An article comprising an organofluorine coating on a major surface of a substrate, wherein the organofluorine coating has a surface composition of about 5 at % to 15 at % oxygen and about 30 at % to 50 at % fluorine; wherein the major surface of the substrate comprises protruding or recessed structures with a density of about 10 structures per $mm^2$ to about 10,000 structures per $mm^2$, wherein the coating overlies and conforms to the structures, wherein the substrate comprises a polymeric film, and wherein the organofluorine coating comprises fluoroether species.

6. The article of claim 5, wherein the organofluorine coating has a thickness of less than about 500 nm.

7. The article of claim 5, further comprising:
a barrier functional coating on the organofluorine coating, wherein the barrier functional coating comprises a polymeric layer on the organofluorine coating and a metal oxide layer on the polymeric layer.

8. An organofluorine coating on a major surface of a substrate, wherein the organofluorine coating has a surface composition of about 5 at % to 15 at % oxygen and about 30 at % to 50 at % fluorine; wherein the major surface of the substrate comprises protruding or recessed structures with a density of about 10 structures per $mm^2$ to about 10,000 structures per $mm^2$, and wherein the coating overlies and conforms to the structures, wherein the organofluorine coating is a fluoropolymer comprising copolymeric repeat units derived from at least one of fluorocarbons having a formula $C_xF_y$ and oxyfluorocarbons having a formula $C_xF_yO_z$, wherein x, y, and z are non-zero positive integers with x=1-6, y=4-14, and z=1, and wherein the values of x, y and z are selected such that the coating comprises about 5 at % to about 15 at % oxygen and about 30 at % to about 50 at % fluorine.

9. The coating of claim 8, wherein the fluorocarbons and oxyfluorocarbons are chosen from $CF_4$, $C_2F_6$, $C_3F_8$, $C_4F_{10}$, and $C_6F_{14}$, $C_6F_{12}O$, and combinations thereof.

10. The coating of claim 9, wherein the fluorocarbon is $C_6F_{14}$.

11. An organofluorine coating on a major surface of a substrate, wherein the organofluorine coating has a surface composition of about 5 at % to 15 at % oxygen and about 30 at % to 50 at % fluorine; wherein the major surface of the substrate comprises protruding or recessed structures with a density of about 10 structures per $mm^2$ to about 10,000 structures per $mm^2$, and wherein the coating overlies and conforms to the structures, wherein the organofluorine coating is a fluoropolymer comprising repeat units derived from fluorocarbons having a formula $C_xF_y$, wherein x=1-6 and y=4-14, reacted with an amount of oxygen sufficient to provide a copolymer with about 5 at % to about 15 at % oxygen and about 30 at % to 50 at % fluorine.

12. The coating of claim 11, wherein the fluorocarbons are chosen from $CF_4$, $C_2F_6$, $C_3F_8$, $C_4F_{10}$, and $C_6F_{14}$, and combinations thereof.

* * * * *